(No Model.)

J. H. RUST.
BASKET.

No. 565,510. Patented Aug. 11, 1896.

Witnesses:
H. J. Levas
M. Richards

Inventor.
John H. Rust
Per. C. D. Levas
Att'y.

UNITED STATES PATENT OFFICE.

JOHN H. RUST, OF PITTSBURG, PENNSYLVANIA.

BASKET.

SPECIFICATION forming part of Letters Patent No. 565,510, dated August 11, 1896.

Application filed October 15, 1895. Serial No. 565,763. (No model.)

*To all whom it may concern:*

Be it known that I, JOHN H. RUST, a citizen of the United States, residing at Pittsburg, in the county of Allegheny and State of Pennsylvania, have invented certain new and useful Improvements in Baskets; and I do hereby declare the following to be a full, clear, and exact description of the invention, such as will enable others skilled in the art to which it pertains to make and use the same, reference being had to the accompanying drawings, which form a part of this specification.

This invention relates to certain new and useful improvements in baskets, and relates more particularly to that class known as "chip" baskets and the like.

The invention has for its object the provision of novel means whereby the handle is securely attached to the body of the basket; furthermore, whereby the body portion and the connection between the handle and the basket proper is greatly strengthened.

The invention has for its still further object to construct a basket that will possess advantages in points of durability and cheapness; furthermore, one that will be extremely simple in its construction.

With the above and other objects in view the invention consists in the novel construction, combination, and arrangement of parts to be hereinafter more particularly described, and specifically pointed out in the claim.

In describing the invention in detail reference is had to the accompanying drawings, forming a part of this specification, and wherein like figures of reference indicate similar parts throughout both views, in which—

Figure 1:
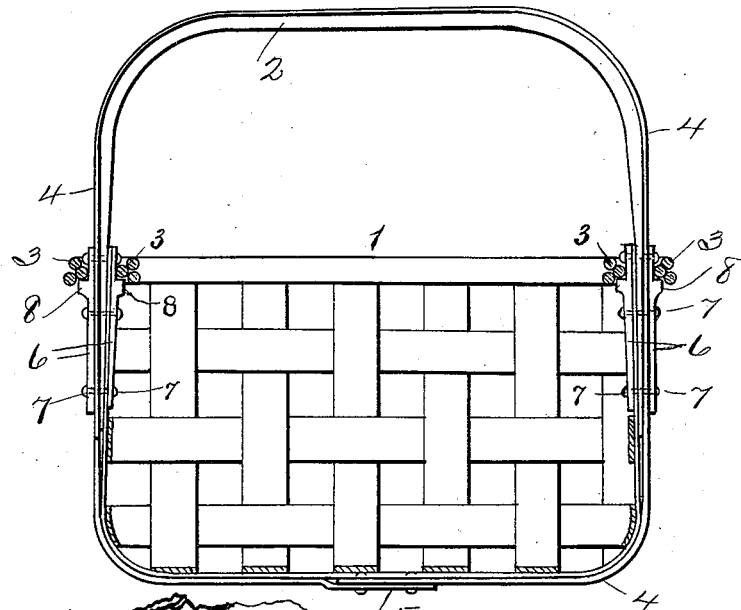
Figure 2:
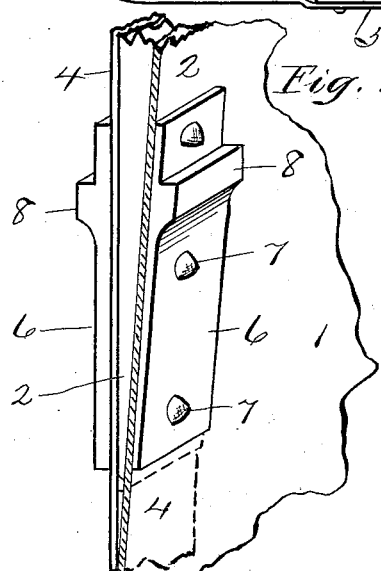

Figure 1 is a side elevation, partly in section. Fig. 2 is a detail perspective view of the clamp.

In the drawings, 1 represents the body portion of the basket, having attached thereto the handle 2.

The reference-figures 3 3 3 represent wires, which are wound around the top of the body portion of the basket and rest on the lugs 8 8 8 8, formed on the clamps 6 6 6 6. Said clamps are used for securing the handle rigidly to the basket by means of rivets 7 7 7 7.

The reference-figures 4 4 represent a band composed of wood or metallic substance, which encircles the handle 2 and the body portion of the basket 1, and is joined together by rivets or other suitable means at the bottom of the basket, as shown at 5.

It will be noted that a basket constructed as above described will be much stronger than when constructed in the ordinary and well-known manner, as the band encircling the handle and body portion of the basket, and being rigidly secured to the basket by means of the clamps, serves to provide much greater strength to the basket than were the handle attached thereto in the ordinary manner. It will also be noted that the basket will be considerably strengthened by the employment of the wires wound around the top of the basket proper, as they will serve the double purpose of retaining the proper shape of the basket and also forming an additional fastening for securing the clamps to the handle and basket.

Attention is also called to the fact that the use of the clamps will serve to retain the handle and band securely in position, while at the same time serving to strengthen the body portion of the basket.

It will be noted that various changes may be made in the details of construction of my improvement in baskets without departing from the general spirit of my invention.

Having fully described my invention, what I claim as new, and desire to secure by Letters Patent, is—

In a basket, the body portion and handle encircled by a band secured to said body portion by means of clamps provided with outwardly-extending lugs, in combination with wires secured to said clamps and the top of said body portion, substantially as described and set forth.

In testimony that I claim the foregoing I hereunto affix my signature this 7th day of December, A. D. 1894.

JOHN H. RUST. [L. S.]

In presence of—
JOHN S. KENNEDY,
O. D. LEVIS.